United States Patent [19]
Masunaga

[11] Patent Number: 5,431,506
[45] Date of Patent: Jul. 11, 1995

[54] PROPERTY OF BONDED METAL, INCLUDING FORMING MATERIAL OF NICKEL-TITATIUM ALLOY, AND THE METHOD OF MANUFACTURING THE SAME

[75] Inventor: Satoru Masunaga, Fukui, Japan

[73] Assignees: Masunaga Menlo Park Co., Ltd., Fukui; Furukawa Electric Co., Ltd., Tokyo, both of Japan

[21] Appl. No.: 768,241
[22] PCT Filed: Mar. 13, 1991
[86] PCT No.: PCT/JP91/00339
§ 371 Date: May 14, 1992
§ 102(e) Date: May 14, 1992
[87] PCT Pub. No.: WO91/13717
PCT Pub. Date: Sep. 19, 1991

[30] Foreign Application Priority Data

Mar. 14, 1990 [JP] Japan .................... 2-65075
Mar. 14, 1990 [JP] Japan .................... 2-65076

[51] Int. Cl.⁶ .................... B25G 3/34; F16B 11/00
[52] U.S. Cl. .................... 403/271; 403/404; 403/179; 228/222; 219/117.1; 351/41; 428/660; 428/680
[58] Field of Search .......... 228/263.13, 263.21, 228/263.19, 222; 219/55, 78.01, 118, 117.1; 428/660, 680, 960; 403/404, 270, 271, 265, 179; 351/41, 83

[56] References Cited

U.S. PATENT DOCUMENTS 4,336,312  6/1982  Clark et al. .................... 428/680
4,552,284  11/1985 Rummelsbur .
4,674,675  6/1987  Mietrach ........................ 228/194
4,952,044  8/1990  Murai .
5,106,010  4/1992  Stuber et al. ................... 228/323

FOREIGN PATENT DOCUMENTS 338586  10/1989  European Pat. Off. .
3327476  2/1984  Germany .
62-045486 2/1987  Japan .
2124474  2/1984  United Kingdom .
8707961  12/1987 WIPO .

OTHER PUBLICATIONS

Hirose et al., *Laser welding of Ti–Ni type shape memory alloy*. Adv. Technol. Weld Mater. Process Eval., vol. 2, pp. 687–692, 1990 (JICST-E Abstract).
Hirose et al., *Laser welding of Ti–Ni type shape memory alloy*. Journal of the Japan Institute of Metals, vol. 54, No. 3, pp. 262–269, 1990 (JICST-E Abstract).
Masahiro, *Welding of shape memory alloy and it's application to various fields*. Yosetsu Gijutsu (Welding Technique) vol. 35 No. 7, pp. 83–87 1987 (JICST-E Abstract).
Takahiro et al., *A study of Ni–Ti shape memory alloy*. Hiroshima Kenritsu Seibu Kogyo Gijutsu Senta Kekyu (Bulletin of the Western Hiroshima Prefecture Industrial Research Institute) No. 32, pp. 88–91 1989 (JICST-E Abstract).
Kimio et al., *Lap resistance welding of TiNi shape memory alloy*. Joitekku (Joining Assembling Engineering) vol. 6 No. 3, pp. 36–40 1990 (JICST-E Abstract).
Kimio et al., *A research on resistance welding of TiNi shape memory alloy*. Nippon Kikai Gakkai KoenKai (List continued on next page.)

Primary Examiner—Donald P. Walsh
Assistant Examiner—Anthony R. Chi
Attorney, Agent, or Firm—Ronald R. Snider

[57] ABSTRACT

This invention relates to the property of a bonded metal including a forming material of a nickel-titanium alloy and its method of manufacture. This bonded metal property is produced by forming a forged structure to achieve an incorporated integral body through the bonding of the nickel-titanium alloy material onto another material of nickel base alloy. The manufacturing method used to achieve this property involves heating both materials at the point to be bonded in an inert gas atomsphere. The materials are first heated to their melting point and in this state are fused together under high pressure. This forms the forged structure on the portion of the materials so treated.

14 Claims, 2 Drawing Sheets

OTHER PUBLICATIONS

Koen Ronbunshu vol. 949, pp. 36-37 1987 (JICST-E Abstract).

Masahiro, *Welding of TiNi shape memory alloys.* Nippon kinzoku Gakkai Kaiho (Bulletin of the Japan Institute of Metals) vol. 24, No. 1 pp. 56-60, 1985 (JICST-E Abstract).

Le, *Improvement of the Weldability of Shape-Memory Ni-Ti alloy Fine Wire.* Conference Report: 6th General Assembly CENIM, Madrid, Spain, 8-11 Oct. 1985 (METADEX Abstract).

Shuji et al., *A study of Lap Resistance Welding of TiNi Shape memory alloy.* Nippon Kikai Gakkai Tokai Shibu Sokai Koenkai Koen Ronbunshu, vol. 41, pp. 46-48, 1992 (JICST-E Abstract).

Shuji et al., *A Study of Welding of TiNi Shape Memory Alloy.* Nippon Kikai Gakkai Tokai Shibu Sokai Koenkai Koen Ronbunshu, vol. 41, pp. 49-51, 1992 (JICST-E Abstract).

Takeshi et al., *Effect of Oxygen on Weldability of Ti-Ni Shape Memory Alloy.* Yoetsu Gakkai Zenkoku Taikai Koen Gaiyo, No. 51, pp. 88-89, 1992 (JICST-E abstract).

Le, *Improvement of the weldability of Ni-Ti shape memory wires to steel 18-8 wire by percussion welding and pulsed-current resistance welding .* Rev. Soldadura, 17(2), 85-94, 1987 (Chem Abstracts).

Beyer et al., *Resistance Welding of TiNi shape memory alloys.* Martensitic Transform. Sci. Technol., [Pap. Eur. Conf.], 199-206. Edited by: Hornbogen, E.; Jost, N. DGM Informationsges.: Oberursel, Fed. Rep. Ger., 1989 (Chem Abstracts).

Shuji et al., *A study of lap resistance welding of TiNi shape memory alloy.* Nippon Kikai Gakkai Tokai Shibu Sokai Koenkai Koen Ronbunshu, vol. 40, pp. 222-224, 1991 (JICST-E abstract).

Conaway, *Welding the nickel alloys Part 1: Cleaning and joint design,* Welding Design & Fabrication, pp. 73-74.

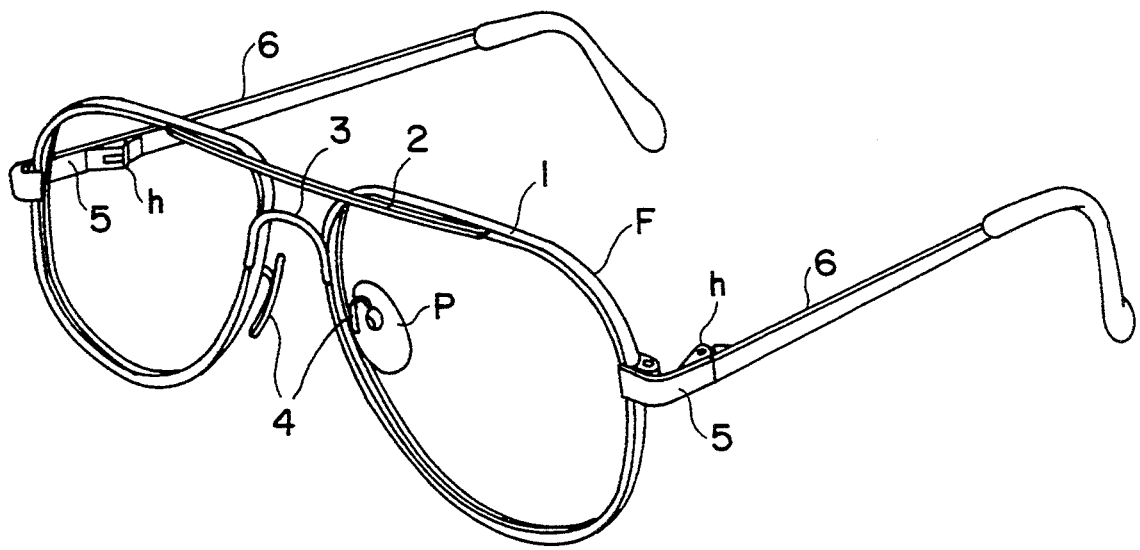
F I G. 1
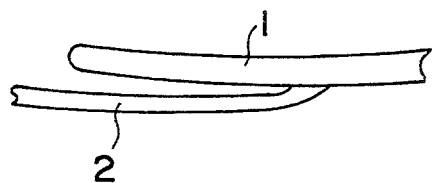
F I G. 2

5,431,506

PROPERTY OF BONDED METAL, INCLUDING FORMING MATERIAL OF NICKEL-TITATIUM ALLOY, AND THE METHOD OF MANUFACTURING THE SAME

BACKGROUND OF THE INVENTION

TECHNICAL FIELD

This invention relates to the properties of bonded metals including forming a nickel-titanium alloy and its manufacturing method. More particularly, it relates to a new bonded metal property formed by incorporating a forming material alloy composed with shape memory, or super-elastic property, which is very difficult to bond, onto a nickel base alloy matterial promptly and correctly on the required portion. This invention also prescribes its manufacturing method. Thus, the invention can provide a wide range of the uses for this nickel-titanium alloy equipped with shape memory or super-elastic alloy material, through which good quality bonded products, for examples, eyeglasses frames, can be obtained.

BACKGROUND ART

Currently, nickel-titanium alloy, composed by the fixed proportion of nickel and titanium at the molecular ratio of 1:1 or approximate, has been confirmed to have special nature and properties. This alloy as a new compound material has been attracting public attention in every industrial field. For instance, a certain kind of nickel-titanium alloy, in which a superior memory effect can be obtained through heat treatment, has been developed for such various uses in the medical field as bone-connecting parts in orthopedics, operation clip for aneurism and so on. Also it has application in other practical fields such as automatic regulating apparatus for air conditioners, automatic window operation apparatus for green house and/or isothermal houses. The antennae of space ships and so on. Other nickel-titanium alloys are equipped with a super-elastic property chemically attained and are quite light weight. These have been used as the core materials in clothings such as wire for orthodontics and in eyeglasses frame. This alloy is expected to have wide usefullness throughout the industrial world.

In prior art, however, the shape memory of nickel and titanium alloys or super-elastic property has been of inferior quality for metallic bonding. In order to bond such nickel-titanium alloys onto small areas, especially for eyeglasses, mechanical connection by use of a rivet or a screw has been necessary, or the use of additional metal plating to allow for bonding must be performed prior to the application of the brazing method.

The rivet or screw method has the following defects: the rivetting or screwing work is troublesome and inefficient; the connecting parts are easy to turn round on the axis of the rivet or screw; and the bonding areas cannot be made smaller than the size of the rivet or screw axis.

The brazing method, on the other hand, has a defect that the durability of bonding is poor. External impact damages it because durability is dependent upon the adherence caused by the plating stratum.

There is another prior art method to bond this nickel-titanium alloy by way of the normal melt welding method. It has been found that the heat supply of melt welding affected change in the original nature of the alloy. It lost the pecularity of shape memory and super-elasticity, and at the same time the welded portions became easily oxidized and thus not durable. Accordingly, this method cannot be considered as a practical method.

All the defects mentioned above naturally restrict the scope of nickel-titanium alloy utility. With regard to eyeglasses, for example, each part is required to be made in a small size. The bonding area of each part is necessarily small, and it is quite difficult to obtain the satisfactory durability by use of prior arts as has been explained. This is the main reason that eyeglasses made of nickel-titanium alloy are not successful on the present market.

In view of these circumstances, the present inventor has developed a novel technology for bonding nickel-titanium alloy equipped with shape memory and super-elasticity onto other different forming metal materials.

SUMMARY OF THE INVENTION

The object of this invention is to present a new method of bonding of nickel-titanium alloys onto other materials of similar or dissimilar quality, without impairing any properties of those memory or super-elasticity.

The present invention has a further object to provide a method to realize the bonded metal property.

The language "Forming Metal of Nickel-Titanium Alloy" refers to the forming metal of nickel-titanium alloy which is marked by shape memory and super-elasticity. This alloy is composed of 60~40% nickel content and 40~60% titanium content. This alloy's properties are also obtained by the following : in stead of nickel of titanium, one or more than two elements such as vanadium(V), aluminum(Al), cobalt(Co), chromium(Cr), steel(Fe), copper(Cu), niobium(Nb) and zirconium(Zr) are substituted comprising at most 10% of the compound.

The term "Nickel Base Alloy" means so-called general nickel base alloy rather than as explained aforsaid.

The inventor contacted the forming metal of nickel-titanium alloy onto other nickel base alloys of differing qualities. The two alloys were incorporated in a metallurgical bond at the point of contact forming a forging structure during the process of eyeglasses frame product. Thus he has succeeded in producing bonded metals in which the forming metal of nickel-titanium alloy is bonded correctly.

In other words, the forging structure which is formed on the contacting spot can be obtained by pressing the alloys togehter in heat-effect melt conditions. These alloys can then be used as eyeglasses frame parts.

In order to perform bonding, a similar nickel-titanium alloy or different nickel base alloy is selected as an opponent object. The rationale for this selection is based on the metallurgical principle that both alloys contain the common material of nickel.

The forming of the forging structure on the point contact assures a strong bond on both materials.

When the forming metal of nickel-titanium alloy is bonded onto a nickel base alloy, the bonding spots of both materials are heated rapidly to soften and melt in the inert atomsphere. The materials then heated, in soft condition, are bonded together by high pressure, whereon the forging structure is formed on the surface by metallurgical means. The incorporation attained by this metallurgical theory provides the method for manufacturing this bonded metal property including the forming metal of nickel-titanium alloy.

As explained above, the forging structure on the bonding spots is attained by high pressure connection during heating effect in a softening condition.

The manufacturing method is detailed as follows:

When a given portion of the forming metal composed of nickel-titanium alloy is bonded onto the forming metal composed of nickel base alloy, the nickel-titanium alloy can be composed of 60~40% nickel content and 40~60% titanium content. For shape memory, a similar alloy but including one or more than two elements of V., Al., Co., Cr., Fe., Cu., Nb., or Zr., without exceeding 10% in its total composition may be used. For a super-elastic alloy, the nickel base alloy can be nickel-molybdenum, or nickel-chromium or nickel-chromium-steel alloy.

A bonding portion of the forming material composed of nickel-titanium alloy can be pre-arranged for annealing treatment. At the same time, in its proximate areas to the bonding spots of both nickel-titanium alloy and nickel base alloy, a thermal conductive metal is used as a cover to form a radiator-like device, to prevent overheating except at the bonding spots. High temperature is rapidly supplied to melt the spot to produce an integral incorporated body. Eyeglasses frame parts can be adopted from this bonded material.

The bonding portion in this specification means the bonding spot and its proximate areas.

BRIEF DESCRIPTIONS OF DRAWINGS

FIG. 1 is a perspective view of a metal eyeglasses frame as produced by the embodiment of the present invention.

FIG. 2 is a partly enlarged flat view of the bonding portion for a brace bar in the same frame.

BEST MODE FOR CARRYING OUT THE INVENTION

Embodiment Example 1

Figure 3:
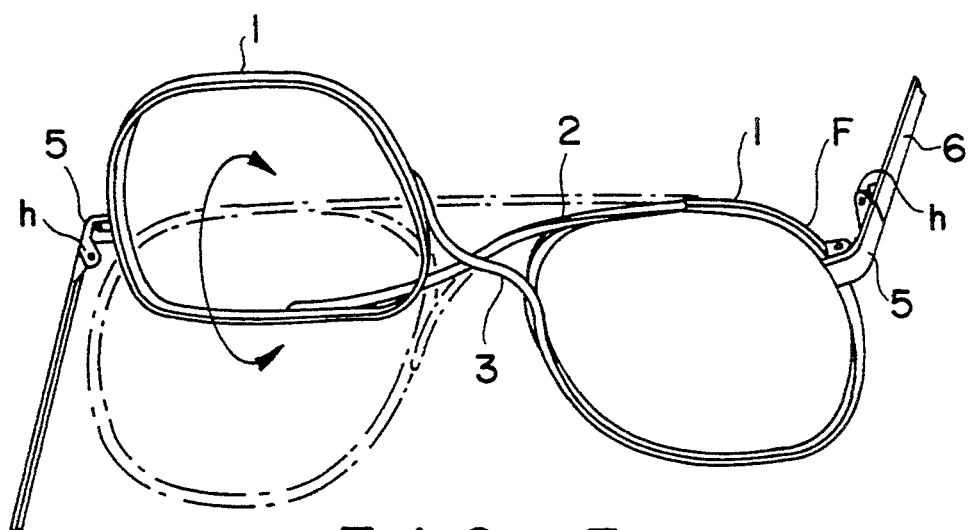
FIG. 3 is an explanatory view showing a bending test for a front frame in the same eyeglasses.
Figure 4:
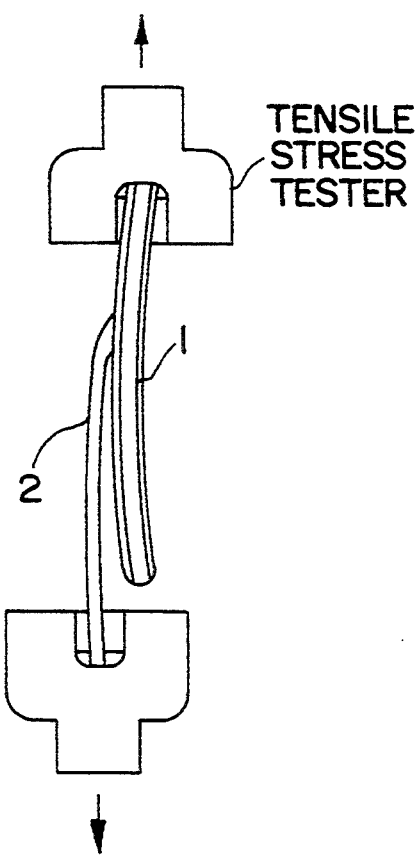
FIG. 4 is an explanatory view showing a tensile stress test for the bending portion.

A 1.4 mm diameter and 7 cm long wire rod of nickel-titanium super-elastic alloy composed of 50~51% nickel, 50~49% titanium and other components below 0.5% is bonded onto 2 mm diameter and 10 cm long rod of nickel-chromium alloy composed of 80 Wt % of nickel, 13 Wt % of chromium and 7 Wt % of other components at the tip of each end.

a) At the immediate area of the bonding point for the super-elastic alloy, high frequency heating is supplied for annealing, and the bonding portion is purified by extracting oxidides, oils and fats. The same purification process is done at the bonding locale of the nickel-chromium alloy;

b) Each bonding portion is now contacted at 2 mm square surface and fixed by a jig. Then, while 20Kg/mm$^2$ pressure is supplied on the bonding spot, chrominium copper plate is wrapped over and around the surround areas. This subject is placed in the inert gas (i.e. argon) atmosphere, and 3 cycles of electric current at 1,000 Amps and 3 volts is run through it, whereon each bonding portion becomes instantly incandescent in the melted condition and is bonded together as one incorporated integral body by the pressure. The metal properby obtained by this method is referred to as "Specimen 1" The temperature at this instant spot is measured at between 1,300 degree C. and 1,450 degree C.

Embodiment Example 2

A 1.4 mm diameter and 7 cm long wire rod of nickel-titanium shape memory alloy composed of 40~60% nickel, 60~40% titanium, with less than 3% copper and less than 0.5% of other components is now bonded onto 2 mm diameter and 10 cm long rod of nickel-copper alloy(=monel metal) composed of more than 63 Wt % nickel and more than 21 Wt % copper in the almost same manner as the embodiment example 1 except that the electric current used is now at 1,500Å. By this method, a very sturdy bonding is obtained, and this metal property is referred to as "Specimen 2".

Embodiment Example 3

An actual metal eyeglasses frame is now produced in the following manner:

The numeral 1 indicates a pair of rims to hold lenses (not shown) located in symmetry. In this embodiment, the rim(1) is produced by the bonding nickel-chromium alloy composed of 80 Wt % nickel, 13 Wt % of chromium and 7 Wt % of other components, with nickel-copper alloy(=monel metal) composed of more than 63 Wt % of nickel and more than 21 Wt % of copper.

The numeral 2 shows a brace bar in the long rod style bridged over the rim(1), while the numeral 3 indicates a bridge in arch style bridged lower than the brace bar(2). These parts, the rim(1), brace bar(2) and bridge(3), constitute a front frame(F) for a metal eyeglasses frame. Both the brace bar(2) and the bridge(3) are produced by nickel-titanium super-eleastic alloy composed of 50~51% nickel, 50~49% titanium and 0.5% or below of other components.

The numeral 4 shows a pad arm supporting a nose pad(P), and it is bonded in symmetry at the foot of the bridge(3). The pad arm(4) is made of nickel-titanium shape memory alloy composed of 40~60% nickel, 60~40% titanium, 3% or less of copper and 0.4% or less of other components. This shape memory alloy is pre-arranged at both martensite and austenite temperatures. Crystal structure transformed in the martensite condition shall return to original form in an austenite condition when dipped into water at 70 degree C.

The numeral 5 is a pair of endpieces in flat spring bent in L-shape to be connected with both ends of the front frame(F). The material of this endpiece is the same nickel-titanium super-elastic alloy as the brace bar(2) and the bridge(3).

The numeral 6 is a pair of ear-racks to be connected with the endpiece(5) via a hinge(h); this material is also nickel-titanium super-elastic alloy, the same as the brace bar(2) and the bridge(3).

In this embodiment example 3, the brace bar(2) and the bridge(3) are bonded onto the rim(1), and the pad arm(4) is also bonded onto the rim(1) in the proximity areas of the brace bar foot, while the end piece(5) is bonded onto the end of the front frame(F), whereas these bonded portions form forging structures according to the metallurgical theory. As a connecting means to bond a nickel-titanium alloy with a nickel base alloy, the bonding portion of each alloy is heated to melting point in an inert gas like argon, while both alloys are pushed together by high pressure. Through this instant heating treatment, the bonding portion and proximity form a very strong forging structure.

The bonding treatment of actual eyeglasses frame parts is now explained in details:

First, all bonding ends of such eyeglasses parts as the brace bar(2), the bridge(3) and the pad arm(4) composed of a nickel-titanium alloy are partly annealed by high frequency heating. Secondly, impurities such as oxides, oils, fats etc. are correctly cleared for clean treatment. Similarly, the rim(1) composed of nickel base alloy is properly cleaned.

Then, the end sections of each eyeglasses parts (2,3, and 4) are fixed by air cylinder vice so that they are correctly contacting on the rim(1). On all contacting portions including proximity areas, chromium copper bands are wound around as a radiator-like device. Then 3 cycles of 1,000~2,000Å electric current are run for 0.05 seconds through the materials in the inert gas (argon gas) atomosphere. At this point all bonding portions become incandescent instantly and melt at 1,300~1,450 degree C., whereupon 20Kg/mm$^2$ pressure is effected on them by the air cylinder vice, completely bonding both alloys. After cooling the same for three minutes at normal temperature, they were broken at the bonding points for careful observation. As a result, it was confirmed that the inner organization of the bonding portion constituted an uniform forging structure with a thickness of 0.5-1 mm around its forging areas as an incorporated integral body.

Test

Specimen 1 obtained by the embodiment example 1 and Specimen 2 obtained by the embodiment example 2 are tested as follows.

(1) Bending Test

Both specimens 1 and 2 recieved the bending test, which was performed by bending the specimens at 180 degree C. toward front and back at a rate of 30 times per minute, for eight minutes (240 rotations). Both specimens retained their original form without any visible deformation; no deterioration of elastic force was recognized.

(2) Tensile Stress Test

Specimens 1 and 2 were tested by a tensile tester model No. AGS-A manufactured by Kabushiki Kaisha Shimadzu Seisakusho; the results are as follows. The test was performed by tightly pinching both ends of the specimens with a clamp. The ends were then pulled focibly in an attempt to separate them.

(2)-1 Specimen 1

When the tensile load reached at 82.7 Kg/f, the object was broken at the spot of the super-elastic metal wire. This is more force than would be encountered under normal use.

(2)-2 Specimen 2

When the tensile load reached at 55.1 Kg/f, the object was broken at the spot of nickel-copper alloy (=monel metal) wire. The obtained strength is also satisfactory for practical use.

According to the embodiment example 3, a brace bar(2) with a 1.4 mm diameter and 7 cm in length and a bridge(3) 2 mm, a diameter and 3.5 cm in length, both composed of nickel-titanium super-elastic alloy at 50–51% nickel, 50–49% titanium and 0.5% less than of other components, were bonded onto a rim(1) of 2 mm diameter and 18 cm circumference composed of a nickel-chromium alloy at 80 Wt % nickel, 12 Wt % chromiun and 7 Wt % or less of other components. This is referred to as "Specimen 3" shown in FIG. 2. A pad arm(4), 1 mm in diameter and 15 cm in length, composed of nickel-titanium shape memory alloy at 40~60% nickel, 60~40% titanium, 3% or less of copper and 0.4% or less other components, was bonded onto a rim(l) of 2 mm in diameter and 15 cm circumference, composed of a nickel-copper alloy(=monel metal) at 63 Wt % or over of nickel and at 21 Wt % or over of copper. This metal property is referred to as "Specimen 4". The only difference in the conditions by which these properties were obtained rested in the electric current used for heating. Specifically, the Specimen 3 was subjected to 1,000Å of current while the Specimen 4 was subjected to 1,500Å.

(1) Bending Test

Specimen 3, as FIG. 3 shows, was tested in the same way as Specimen 1 and 2. Namely, bending 180 degree C. at a rate of 30 times per minute for eight minutes (240 total). The results indicate that no visible deformation nor deterioration of elastic force took place.

(2) Tensile Stress Test

About 3 cm distance each from the center where the brace bar(2) and the rim(1) were bonded together in the Specimen 3 was cut out for the testing, while about 15 mm distance each was cut out in the Specimen 4, and they were subjected to the tensile tester model No. AGS-A manufactured by Kabushiki Kaisha Shimadzu Seisakusho in the same manners as aforsaid. The followings are measured results obtained therethrough.

(2)-1 Specimen 3

When the tensile load of 82.7 Kg/f was applied to the specimen 3, the object was broken on the spot of superelastic metal wire. This strength is sufficient to meet the requirements for the production of eyeglasses frames.

(2)-2 Specimen 4

At a tensile load of 55.1 Kg/f on specimen 4, the object was broken on the spot of the bend. This also satisfies the sturdiness requirements to produce the pad arm for eyeglasses.

(3) Shape Memory Test

In order to determine whether the bonding treatment might affect the pre-arranged shape memory or not, Specimen 4 was bent 5 mm in 20 degree C. temperature. After this bending, it was placed in water heated to 70 degree C., and it returned to original form in near perfect condition.

The present invention contains the technological bases as explained so far, but it is not only limited to the embodiments mentioned. For instance, in the experiments discussed, partial annealing treatment is exercised on a nickel-titanium alloy. This annealing treatment is an extra measure for break prevention in the later pressing procedure. This annealing procedure is not necessary when the bonded material thick or large enough that breaking is not a fear in the working treatment. It is also available to produce the bonding portions of each material to be protruding so that the centralization of heating is offered thereupon. These kinds of devices shall belong to the concept of this invention.

INDUSTRIAL APPLICABILITY

As has been explained, this invention is designed to provide the bonded metal property by strongly bonding the shape memory or super-elastic nickel-titanium alloy material onto the other nickel base alloy material. It is proved by the tests that, even if the bonding areas are quite small, a sturdy bond is still obtained. Thus, this property can be used for the manufacturer of eyeglasses frames, medical equipments and for all industrial fields.

In addition, according to the method used in the present invention, wherein nickel-titanium alloy material and nickel base alloy material are both heat pressed under melted conditions to produce a forging structure on the bonding portion and to bond both materials in an incorporated integral body, the nickel-titanium alloy material can be strongly bonded to other different nickel base alloy materials, in a way considered difficult in previous technology.

In the methodology of the present invention, nickel-titanium alloy material and nickel base alloy material are heated to their melting point, but the heating portion is only limited to a very narrow area and also the heating time is very short. Therefore, this heating process does not affect any place but the actual heated area. Here too, the correct bonding is achieved very rapidly.

Therefore, the bonded metal property and the relative method shall benefit all industrial fields.

What is claimed is:

1. A bonded nickel-titanium and nickel base alloy metal comprising:
    a forged structure formed on respective bonding portions of a forming metal of nickel-titanium alloy and a forming metal of a different kind of nickel base alloy, and
    wherein both of the forming metals are bonded by forge welding.

2. The bonded alloy metal according to claim 1, wherein:
    one or more materials selected from the group of V, Al, Co, Cr, Fe, Cu, Nb, and Zr are included instead of nickel or titanium in said forming metal of nickel-titanium alloy and not exceeding 10% of the nickel-titanium alloy;
    said forming metal of a different kind of nickel base alloy is selected from the group of nickel-copper alloy, nickel-molybdenum alloy, nickel-chromium alloy, and nickel-chromium-steel alloy.

3. The bonded alloy metal according to claim 1, wherein
    the forming metal of nickel-titanium alloy has a shape of eyeglasses parts and
    the forming metal of nickel base alloy has a shape of adjacent eyeglasses parts bonded to the eyeglasses parts of the nickel-titanium alloy.

4. The bonded alloy metal according to claim 3, wherein
    said eyeglasses parts are brace bars or bridges composed of nickel-titanium alloy, and
    the other opposing eyeglasses parts are rims composed of nickel base alloy.

5. The bonded alloy metal according to claim 3, wherein
    said eyeglasses parts are pad arms composed of nickel-titanium alloy, and
    the other opposing eyeglasses parts are rims composed of nickel base alloy.

6. The bonded alloy metal according to claim 3, wherein
    said eyeglasses parts are end pieces composed of nickel-titanium alloy, and
    the other opposing eyeglasses parts are rims composed of nickel base alloy.

7. The bonded alloy metal according to claim 1, wherein the forged structure is formed in an inert atmosphere.

8. The bonded alloy metal according to claim 1, wherein the forged structure is formed in conditions of pressed plastic flow under rapid heating as well as rapid heat radiation.

9. The bonded alloy metal according to claim 7, wherein the forged structure is formed in conditions of pressed plastic flow under rapid heating as well as rapid heat radiation.

10. A method of manufacturing a bonded nickel-titanium and nickel base alloy metal comprising the steps of:
    using metal of nickel-titanium alloy whose nickel content is 40–60% and whose titanium content is 60–40%;
    bonding contacting portions of said nickel-titanium alloy and a metal of nickel base alloy in an inert atmosphere by;
    forming a radiator-like device in the proximity of the contacting portions of both of the metals;
    rapidly heating contacting portions of said metals to a temperature close to the melting point of nickel while the contacting portions are temporarily kept in a heat-melt condition;
    pressing together the metals by high pressure within the very short time while a local plastic flow is simultaneously generated in the contacting portions; and
    rapidly decreasing the temperature of the contacting portions by heat radiation through said radiator-like device, whereby
    a forged structure is formed on the pressed contacting portions and both the forming metals are integrally bonded metallurgically.

11. The method according to claim 10, wherein:
    one or more materials selected from the group of V, Al, Co, Cr, Fe, Cu, Nb, and Zr are included instead of nickel or titanium in said nickel-titanium alloy and not exceeding 10% of the nickel-titanium alloy, and
    said forming metal of nickel base alloy is selected from the group of nickel-copper alloy, nickel-molybdenum alloy, nickel-chromium alloy, or nickel-chromium-steel alloy.

12. The method according to claim 10, wherein the contacting portion of the nickel-titanium alloy is partially annealed prior to bonding.

13. The method according to claim 10, wherein:
    a radiator-like device formed in the proximity of the contacting portions of the nickel-titanium alloy and the nickel base alloy is made of a heat-conductive metal material covering the areas in proximity to the contacting portions.

14. The method according to claim 10, wherein:
    the nickel-titanium alloy is eyeglasses parts; and
    the nickel base alloy is eyeglasses parts to be directly bonded to the eyeglasses parts of the nickel-titanium alloy.

* * * * *

UNITED STATES PATENT AND TRADEMARK OFFICE
CERTIFICATE OF CORRECTION

PATENT NO. : 5,431,506
DATED : Jul. 11, 1995
INVENTOR(S) : Masunaga

It is certified that error appears in the above-indentified patent and that said Letters Patent is hereby corrected as shown below:

On the cover page, TITLE(54), line 3, delete "TITATIUM" and insert --TITANIUM--; ABSTRACT(57), line 10, delete "atomosphere" and insert --atmosphere--. Column 1, line 3, delete "TITATIUM" and insert --TITANIUM--; line 15, delete "matterial" and insert --material--; line 68, delete "pecularity" and insert --peculiarity--. Column 2, line 34, delete "nickel of" and insert --nickel or--; line 64, delete "atomosphere" and insert --atmosphere--. Column 3, line 63, delete "atomosphere" and insert --atmosphere--; line 68, delete "properby" and insert --property--. Column 4, line 15, delete "Å" and insert --A--. Column 5, line 17, delete "Å" and insert --A--; line 19, delete "atomosphere" and insert --atmosphere--; line 37 delete "recieved" and insert --received--; line 51, delete "focibly" and insert --forcibly--; line 66, delete "2 mm" and insert --1.2 mm--. Column 6, line 17, delete "Å" and insert --A--; line 18, delete "Å" and insert --A--.

Signed and Sealed this

Fourteenth Day of November, 1995

Attest:

BRUCE LEHMAN

Attesting Officer

Commissioner of Patents and Trademarks